United States Patent
Coughlin et al.

(10) Patent No.: US 8,263,709 B2
(45) Date of Patent: Sep. 11, 2012

(54) CRYSTAL NUCLEATING AGENTS, CRYSTALLINE POLYMER COMPOSITION, METHODS OF MANUFACTURE THEREOF, AND ARTICLES THEREOF

(75) Inventors: E. Bryan Coughlin, Amherst, MA (US); Yoshinobu Nozue, Ichihara (JP); Shuichiro Seno, Sodegaura (JP)

(73) Assignees: University of Massachusetts, Boston, MA (US); Sumitomo Chemical Company, Limited (JP)

( * ) Notice: Subject to any disclaimer, the term of this patent is extended or adjusted under 35 U.S.C. 154(b) by 32 days.

(21) Appl. No.: 12/947,288

(22) Filed: Nov. 16, 2010

(65) Prior Publication Data

US 2011/0118415 A1    May 19, 2011

Related U.S. Application Data

(60) Provisional application No. 61/261,462, filed on Nov. 16, 2009.

(51) Int. Cl.
*C08L 43/04* (2006.01)
*C08F 230/08* (2006.01)

(52) U.S. Cl. ......................................... 525/209; 526/279
(58) Field of Classification Search .................... 525/50, 525/55, 191, 209
See application file for complete search history.

(56) References Cited

U.S. PATENT DOCUMENTS

| | | | | |
|---|---|---|---|---|
| 6,586,548 B2 * | 7/2003 | Bonafini et al. | .............. | 526/279 |
| 6,911,518 B2 * | 6/2005 | Lichtenhan et al. | ............. | 528/15 |
| 7,049,044 B2 * | 5/2006 | Gonsalves et al. | ......... | 430/270.1 |
| 7,378,456 B2 * | 5/2008 | Elce et al. | ..................... | 522/153 |
| 7,381,471 B2 * | 6/2008 | Augustine et al. | ............ | 428/447 |
| 7,655,738 B2 * | 2/2010 | Keller et al. | ................... | 525/477 |
| 8,053,515 B2 * | 11/2011 | Elce et al. | ...................... | 524/599 |
| 2004/0202622 A1 * | 10/2004 | Quadir | ............................. | 424/59 |
| 2004/0242821 A1 * | 12/2004 | Hatakeyama et al. | ........ | 526/250 |
| 2005/0192409 A1 * | 9/2005 | Rhodes et al. | ............. | 525/326.7 |
| 2008/0181859 A1 * | 7/2008 | Farcet | ............................. | 424/59 |

OTHER PUBLICATIONS

Seurer et al. "Ethylene-Propylene-Silsesquioxane Thermoplastic Elastomers" Macromol. Chem. Phys. 2008, 209, 1198-1209.*
Zheng et al. "Synthesis of Polyethylene Hybrid Copolymers Containing Polyhedral Oligomeric Silsesquioxane Prepared with Ring-Opening Metathesis Copolymerization" Journal of Polymer Science: Part A: Polymer Chemistry, 2001, 39, 2920-2928.*
Seurer et al. "Ethylene-Propylene-POSS Elastomers", Polymer Preprints, 2005, 2 pages.*
Lee et al. "Preparation of Ethylene/Polyhedral Oligomeric Silsesquioxane (POSS) Copolymers with rac-Et(Ind)2ZrCl2/MMAO Catalyst System" Progress in Olefin Polymerization Catalysts and Polyolefin Materials, 2006, 53-58.*
"Handbook of Thermoplastic Elastomers" George Drobny, William Andrew Publishing, 2007, pp. 1-8.*

(Continued)

*Primary Examiner* — Robert S Loewe
(74) *Attorney, Agent, or Firm* — Cantor Colburn LLP

(57) ABSTRACT

A polymer composition, including: a first copolymer, including a first monomer unit derived from a monomer of Formula A:

$$(R^1 SiO_{1.5})_x (R^2 SiO_{1.5})_y \qquad \text{Formula A}$$

wherein $R^1$ is a polymerizable functional group, $R^2$ is a non-polymerizable group, x is a positive integer, and y is a positive integer, provided that x+y=2n, wherein n is an integer greater than or equal to 3; a second monomer unit copolymerizable with the first monomer unit; and a second polymer having no monomer units derived from a monomer of Formula A; wherein the content of the monomer unit of Formula A is 4 wt % or less, based on the total weight of the polymer components of the polymer composition.

17 Claims, 3 Drawing Sheets

OTHER PUBLICATIONS

"Polymer Blends Handbook", L.H. Utracki, 2003, pp. 1-4.*
T. S. Haddad et al., "Hybrid Organic-Inorganic Thermoplastics: Styryl-Based Polyhedral Oligomeric Silsesquioxane Polymers" Macromolecules, 1996, vol. 29, pp. 7302-7304.
L. Zheng et al., "Novel Polyolefin Nanocomposite: Synthesis and Characterizations of Metallocene_Catalyzed Polyolefin Polyhedral Oligomeric Silsesquioxane Copolymers" Macromolecules 2001, vol. 34, pp. 8034-8039.
L. Zheng et al., "X-ray Charaterizations of Polyethylene Polyhedral Oligomeric Silsesquioxane Copolymers" Macromolecules 2002, vol. 35, pp. 2375-2379.
B. Seurer et al., "Fluoroelastomer Copolymers Incorporating Polyhedral Oligomeric Silsesquioxane" Macromolecular Chemistry and Physics, 2008, vol. 209, pp. 2040-2048.

* cited by examiner

CRYSTAL NUCLEATING AGENTS, CRYSTALLINE POLYMER COMPOSITION, METHODS OF MANUFACTURE THEREOF, AND ARTICLES THEREOF

This application claims priority to U.S. Provisional Application No. 61/261,462, filed on Nov. 16, 2010, the content of which in its entirety is herein incorporated by reference.

BACKGROUND OF THE INVENTION

This disclosure relates to a crystalline polymer composition and a crystal nucleating agent.

Thermoplastic polymers such as polyolefins can be readily molded under a variety of conditions to produce articles for a broad range of applications. One method of improving the transparency and mechanical strength of an article molded from a thermoplastic polymer is to improve the crystallinity of the polymer. Crystallization can be promoted by adding a crystal nucleating agent. In addition, it can be advantageous to control the crystal orientation in the polymer to further improve optical and other properties of the molded article. However, the nucleating effect of commercially available crystal nucleating agents is insufficient on some polymers, in particular polyolefins such as those derived from ethylene and other monomers.

The heat resistance and viscoelastic properties of some polymers can be affected by the incorporation of a polyhedral oligomeric silsesquioxane ("POSS"). For example, Haddad et al. reported that a copolymer obtained by copolymerizing a POSS-containing monomer and styrene provided improved heat resistance and viscoelastic properties compared to a styrene homopolymer. (T. S. Haddad et al., *Macromolecules*, 1996, Vol. 29, p. 7302.) In addition, L. Zheng et al. have reported a copolymer obtained by copolymerizing a POSS-containing monomer and ethylene or propylene. (L. Zheng et al., *Macromolecules* 2001, Vol. 34, pp. 8034-8039.) Further, Zheng et al. have reported that if the amount of POSS contained in a copolymer is increased, a plurality of POSS moieties can form an aggregated crystal in the form of plate. (L. Zheng et al., *Macromolecules* 2002, Vol. 35, pp. 2375-2379.) It has also been found that formation of a POSS aggregated crystal can be controlled by binding an alkyl group to Si in POSS. For example, it has been reported that when a monomer having a POSS containing an ethyl, isobutyl or phenyl group bound to Si is copolymerized with other monomer, the POSS does not readily form an aggregated crystal and a copolymer containing very well dispersed POSS is obtained. (B. Seurer et al., *Macromol. Chem. Phys.* 2008, Vol. 209, p 2040).

There nonetheless remains a need in the art for an improved crystal nucleating agents for use with thermoplastic polymers such as polyolefins. There further remains a need for both polyolefins and polyolefin compositions having improved crystallinity. It would be a still further advantage if the polyolefins and polyolefin compositions have improved crystal orientation, particularly after crystallization by cooling after deformation under melted conditions.

BRIEF SUMMARY OF THE INVENTION

A polymer composition comprises: a first polymer, comprising a first monomer unit derived from a monomer of Formula A:

$$(R^1SiO_{1.5})_x(R^2SiO_{1.5})_y \qquad \text{Formula A}$$

wherein $R^1$ is a polymerizable functional group, $R^2$ is a non-polymerizable group, x is a positive integer, and y is a positive integer, provided that x+y=2n, wherein n is an integer greater than or equal to 3; a second monomer unit copolymerizable with the first monomer unit; and a second polymer having no monomer units derived from a monomer of Formula A; wherein the content of the monomer unit of Formula A is 4 wt % or less, based on the total weight of the polymer components of the polymer composition.

Also disclosed is a method for the manufacture of the above-described polymer composition, comprising melt blending the first polymer and the second polymer.

Further disclosed is an article comprising the above-described composition.

Still further disclosed is a method for the manufacture of the above-described article, comprising melt blending the first polymer and the second polymer; molding the melt-blended composition; and cooling the melt-blended compositions at a rate effective to crystallize the polymer composition.

Still further described is a copolymer, comprising: a first monomer unit derived from a monomer of Formula A:

$$(R^1SiO_{1.5})_x(R^2SiO_{1.5})_y \qquad \text{Formula A}$$

wherein $R^1$ is a polymerizable functional group, $R^2$ is a non-polymerizable group, x is a positive integer, and y is a positive integer, provided that x+y=2n, wherein n is an integer greater than or equal to 3; and a second monomer unit copolymerizable with the first monomer unit; wherein the content of the monomer unit of Formula A is 4 wt % or less, based on the total weight of the monomer units of the copolymer.

A method for the manufacture of the above-described copolymer comprises copolymerizing the monomer of Formula A with the second monomer in the presence of a catalyst.

A polymer composition comprises, as the only polymer component, the copolymer described above.

Further disclosed is an article comprising a polymer composition that comprises, as the only polymer component, the copolymer described above.

A polymer composition is further described, the polymer composition having a degree of orientation equal to or greater than 0.01 when measured by a method comprising: heating a press-molded test piece having a width of 10 millimeters, a length of 20 mm, and a thickness of 0.7 mm at a temperature 29° C. greater than the melting point of the polymer composition for 3 minutes; cooling the press-molded test piece to a temperature 9° C. greater than the melting point of the polymer; elongating at a Hencky rate of 1 $s^{-1}$ for 2 seconds, unless the press-molded test piece is broken, in which case the press-molded test piece is elongated for 1 second; maintaining the elongated condition for 300 seconds; quenching the press-molded test piece; and determining a degree of orientation from an azimuthal angle distribution of diffraction intensities corresponding to an a00 plane and a 0b0 plane, when measured by two-dimensional X-ray diffraction.

These and other features, aspects, and advantages of the disclosed embodiments will become better understood with reference to the following drawings, description, and appended claims.

BRIEF DESCRIPTION OF THE DRAWINGS

The following Figures are exemplary embodiments, wherein like elements are numbered alike.

DETAILED DESCRIPTION OF THE INVENTION

Figure 1:
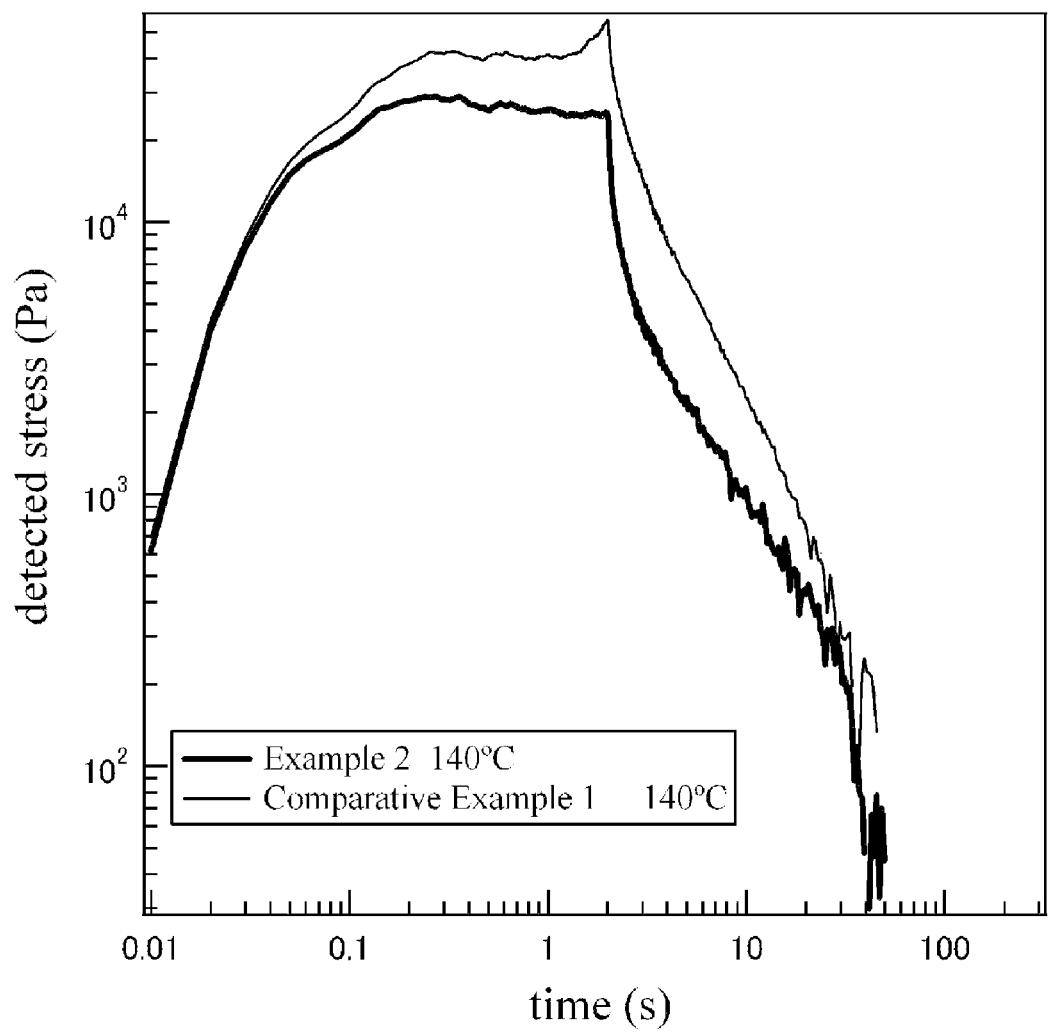
FIG. 1 is a graph illustrating detected stress (Pascals) versus time (seconds) of the polymer compositions synthesized as described in Example 2 and Comparative Example 1.

The inventors hereof have discovered that copolymers containing units derived from POSS function as crystal nucleating agents for thermoplastic polymers, in particular for polyolefins. The copolymers are superior to present commercially available nucleating agents. Also described herein are polymer compositions having improved crystal orientation manufactured using the copolymer nucleating agent as a first polymer, together with a second polymer. The polymer compositions are crystallized by cooling after deformation in a melted state. The polymer compositions are especially useful in the manufacture of films and sheets for thermal management and optical applications.

The copolymer (also referred to herein as "first polymer") contains at least two units, wherein the first monomer unit contains POSS and the second monomer unit does not contain POSS. The copolymer can accordingly be manufactured by copolymerization of a first monomer that contains POSS with a second monomer that does not contain POSS.

The first monomer is a monomer of Formula A

$$(R^1SiO_{1.5})_x(R^2SiO_{1.5})_y \quad \text{Formula A}$$

wherein $R^1$ is a polymerizable functional group, $R^2$ is a non-polymerizable group, x is a positive integer, and y is an integer greater than 0, provided that x+y=2n, wherein n is an integer greater than or equal to 3.

A wide variety of polymerizable groups can be used in the monomer of Formula A. In one embodiment, $R^1$ is an alkenyl group having 2 to 40 carbon atoms, an alkenylaryl group having 8 to 50 carbon atoms, an alkenyloxy group having 2 to 40 carbon atoms, an alkenyl carboxylate group having 2 to 40 carbon atoms, an alkenylsiloxy group having 2 to 40 carbon atoms, a nitrogen-containing alkenyl group having 2 to 40 carbon atoms, and the like. In any of the embodiments described herein, when a plurality of $R^1$ groups is present, each $R^1$ in the monomer of Formula A can be the same or different. In a specific embodiment, each $R^1$ is the same.

More specifically, $R^1$ can be an alkenyl group having 3 to 30 carbon atoms, an alkenylaryl group having 9 to 30 carbon atoms, an alkenyloxy group having 3 to 30 carbon atoms, an alkenyl carboxylate group having 3 to 30 carbon atoms, an alkenylsiloxy group having 3 to 30 carbon atoms, a nitrogen-containing alkenyl group having 3 to 30 carbon atoms, and the like, or a combination thereof.

Still more specifically, $R^1$ is an alkenyl group having 4 to 20 carbon atoms, an alkenylaryl group having 10 to 20 carbon atoms, an alkenyloxy group having 4 to 20 carbon atoms, an alkenyl carboxylate group having 4 to 20 carbon atoms, an alkenylsiloxy group having 4 to 20 carbon atoms, a nitrogen-containing alkenyl group having 4 to 20 carbon atoms, and the like, or a combination thereof.

Exemplary alkenyl groups represented by $R^1$ include acyclic alkenyl groups, such as a vinyl group, an allyl group, a methallyl group, a crotyl group, a 1-butenyl group, a 2-butenyl group, a 3-butenyl group, a 4-pentenyl group, a 1-methyl-4-pentenyl group, a 2-methyl-4-pentenyl group, a 3-methyl-4-pentenyl group, a 1-hexenyl group, a 2-hexenyl group, a 3-hexenyl group, a 4-hexenyl group, a 5-hexenyl group, and the like; and cyclic alkenyl groups, such as a 1-cyclopentyl group, a 2-cyclopentyl group, a 3-cyclopentyl group, a 1-cyclohexenyl group, a 2-cyclohexenyl group, a 3-cyclohexenyl group, a 4-vinylcyclohexyl group, a 2-(2-norbornenyl)ethyl group, a 2-(5-norbornenyl)ethyl group, a 3-2-norbornenyl)propyl group, a 3-5-norbornenyl)propyl group, a 4-2-norbornenyl)butyl group, a 4-(5-norbornenyl)butyl group, and the like.

Exemplary alkenylaryl groups represented by $R^1$ include a 3-(vinyl)phenyl group, a 4-(vinyl)phenyl group, a 4-3-(butenyl)phenyl group, a 4-(5-hexenyl)phenyl group, and the like.

Exemplary alkenyloxy groups represented by $R^1$ include a vinyloxy group, a 2-propenyloxy group, a 3-butenyloxy group, a 5-hexenyloxy group, and the like.

Exemplary alkenyl carboxylate groups represented by $R^1$ include an acryloxy group, a (meth)acryloxy group, a 3-butenyl carboxylate group, a 5-hexenyl carboxylate group, a 2-5-norbornenyl)ethoxy group, and the like.

Exemplary alkenylsiloxy groups represented by $R^1$ include a vinyldimethylsiloxy group, an allyldimethylsiloxy group, a 3-butenyldimethylsiloxy group, a 5-hexenyldimethylsiloxy group, and the like.

Exemplary nitrogen-containing alkenyl groups represented by $R^1$ include alkenyl group-containing primary amines such as an N-(vinyl)amino group, an N-(2-propenyl)amino group, and the like, vinyl group-containing secondary amines such as an N-(vinyl)-N-methylamino group, an N-(2-propenyl)-N-methylamino group, and the like, an alkenylpyridyl group such as a 4-vinylpyridyl group and the like.

Further in Formula A, $R^2$ is a non-polymerizable group. As is known in the art, functional groups that are inert under one set of conditions can be polymerized under a different set of conditions. Thus, as used herein, "a non-polymerizable group" means a group that does not readily polymerize under the conditions used to form the copolymer or the polymer compositions.

Exemplary non-polymerizable groups represented by $R^2$ include an acyclic alkyl group having 1 to 8 carbon atoms, such as a methyl group, an ethyl group, a n-butyl group, a n-hexyl group, an iso-butyl group, and the like; a cyclic alkyl group having 3 to 8 carbon atoms, such as a cyclopentyl group, and the like; and an aromatic group having from 6 to 10 carbon atoms, for example a phenyl group, and the like. When a plurality of $R^2$ groups is present, each $R^2$ can be the same or different. In a specific embodiment, each $R^2$ is the same.

In one embodiment of Formula A, x is specifically 1 to 10, more specifically 2 to 8, still more specifically 3 to 7; y is 1 to 15, specifically 2 to 12, more specifically 3 to 9. The mobility of the main chain of the copolymer can be improved by selecting n to be 2 to 10, specifically 3 to 6, more specifically 3, 4, or 5. In a specific embodiment, x is 1 and y is 7, or x is 2 and y is 6. In yet another embodiment x is 1 and y is 4.

In any of the embodiments, as the monomer of Formula A, two or more different monomers of Formula A can be used.

Specific examples of the monomer of Formula A include compounds of Formulas A1 to A4:

Formula A1

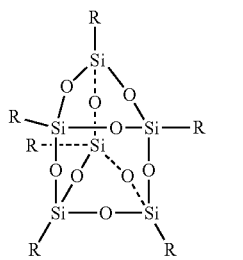

Formula A2

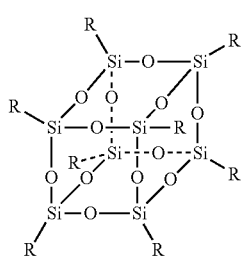

Formula A3

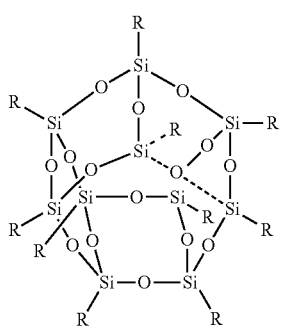

Formula A4

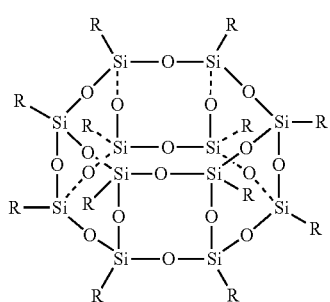

wherein each R is independently $R^1$ or $R^2$ as described above, provided that at least one $R^1$, i.e., a polymerizable functional group, is present.

In a specific exemplary embodiment of the monomer of Formula A, one R is a norbornenylethyl group as the polymerizable functional group, such that the monomer of Formula A has a structure as shown in Formula A5.

Formula A5

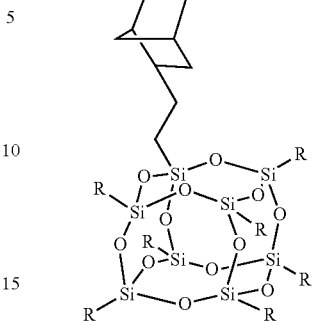

wherein each R is $R^2$ as described above.

The copolymer can be obtained by copolymerizing a first monomer of the above-described Formula A, and a second monomer that is copolymerizable with the first monomer and that is different than the first monomer. The second monomer does not contain POSS.

In one embodiment the second monomer is ethylene or an alkenyl-containing compound having 3 to 20 carbon atoms, for example an alpha-olefin ("α-olefin"), a cyclic olefin, a conjugated diene, a non-conjugated diene, an unsaturated carboxylic acid, a vinyl ester, an olefinic amide, and an alkenyl aromatic compound.

Exemplary α-olefins include ethylene, propylene, 1-butene, 1-pentene, 1-hexene, 1-heptene, 1-octene, 1-nonene, 1-decene, 1-dodecene, 1-eicosene, 4-methyl-1-pentene, 4-methyl-1-hexene, and the like.

The second monomer can also be a cyclic olefin. Exemplary cyclic olefins include vinylcyclohexane, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene, and the like.

Other exemplary second monomers include conjugated dienes such as 1,3-butadiene, 2-methyl-1,3-butadiene, and the like; non-conjugated dienes such as 1,4-pentadiene, 1,5-hexadiene, 2,5-norbornadiene, and the like; an unsaturated carboxylic acid such as acrylic acid, methacrylic acid and the like, an unsaturated carboxylate such as methyl acrylate, ethyl acrylate, butyl acrylate, methyl methacrylate, ethyl methacrylate, and the like; a vinyl ester such as vinyl acetate, and the like; an alkenyl aromatic compound such as styrene, an alkenylbenzene such as 2-phenylpropylene, 2-phenylbutene, 3-phenylpropylene, and the like, an alkylstyrene such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tertiary-butylstyrene, p-secondary-butylstyrene, and the like, a bisalkenylbenzene such as divinylbenzene, and the like, and an alkenylnaphthalene such as 1-vinylnaphthalene, and the like.

The second monomer can be an unsaturated amide compound, such as acrylamide and the like, or an unsaturated cyano group containing compound, such as acrylonitrile, alpha-methacrylonitrile, and the like.

In a specific embodiment, the second monomer is ethylene, 1-butene, 1-hexene, 2-norbornene, and the like, or a combination thereof. In another embodiment, the second monomer is ethylene.

The foregoing monomers may be used singly or in combination, including a combination further comprising a monomer known in the art so long as the desired properties of the resulting polymer are not substantially degraded.

The copolymer can contain the first monomer unit derived from a monomer of Formula A in an amount of 0.1 to 5 mol %, specifically 0.5 to 4 mol %, more specifically 1 to 3 mol %, based on the total moles of monomer units in the first polymer. The amount of the first monomer unit is 5 mol % or less, specifically 3.5 mol % or less, more specifically 2.5 mol % or less in order to enhance the processability of the polymer composition. The amount of the first monomer unit in the first polymer is 0.1 mol % or more, specifically 0.2 mol % or more, more specifically 0.3 mol % or more in order to provide sufficient nucleation of the polymer composition.

The copolymer can be produced by known methods, depending on the particular monomers and the polymerizable groups. For example, the monomer of Formula A and the second monomer can be copolymerized in the presence of a catalyst. In another embodiment, the monomer of Formula A can be graft-polymerized, for example using peroxide, to form a polymer obtained by polymerizing the second monomer. Exemplary catalysts include a metallocene catalyst, Brookhart's catalyst, and the like.

In an embodiment, the copolymer does not have an aggregated crystal structure, which can adversely affect processability in the melt. Thus, when the copolymer is analyzed by wide-angle X-ray diffraction, a diffraction peak corresponding to a scattering vector ("q") is not detected between 0.36 and 0.73 inverse angstroms ($Å^{-1}$). When a POSS forms an aggregated crystal structure, a diffraction peak corresponding to the scattering vector q is observed.

The copolymer described herein can be used in polymer compositions for a variety of applications, with or without additives as known in the art. When used in a polymer composition the monomer unit derived from the monomer of formula A is present in an amount of 0.001 to 4 weight percent ("wt %"), specifically 0.01 to 4 wt %, more specifically 0.1 to 4 wt %, based on the total weight of the copolymer. Suitable additives are known in the art, and include, for example, a flame retardant, an antioxidant, an anti-blocking agent, a neutralizing agent, a lubricant, a deglosser, a mold release agent, a filler, an ultraviolet light absorbent, an infrared absorbant, and the like, or a combination thereof. The selection and amount of such additives will depend on the particular application, and can be readily determined by one of ordinary skill in the art without undue experimentation.

The copolymer can also be used in combination with a second polymer. For example, the copolymer is effective as a crystal nucleating agent for various polymers, particularly polyolefins such as polyethylene homopolymers and polyethylene copolymers. Thus, polymer compositions as described herein contain the copolymer as a first polymer, together with a second polymer. The second polymer in the polymer compositions does not contain any units derived from the monomer of Formula A.

The second polymer can be a crystalline thermoplastic polymer such as a polyolefin, a polyamide, a polyester, a polyacetal, and the like. A combination of different crystalline thermoplastic polymers can be used, or a combination of a crystalline thermoplastic polymer and a non-crystalline thermoplastic polymer such as a polystyrene, an acrylonitrile-butadiene-styrene copolymer ("ABS"), a polycarbonate, a polyphenylene oxide, a polyacrylate, and the like, or a combination thereof. In an embodiment, the second polymer is polyvinyl chloride.

Exemplary polyolefins include units derived from ethylene, propylene, butene, 4-methyl-1-pentene, 3-methyl-1-butene, hexene, and the like. The monomers can be partially or fully fluorinated or chlorinated. Homopolymers or copolymers comprising units derived from the foregoing monomers can be used, specifically ethylene, propylene, and 4-methyl-1-pentene.

Exemplary polyesters include aromatic polyesters such as polyethylene terephthalate, polyethylene naphthalate, polybutylene terephthalate, and the like; and polycaprolactone, polyhydroxy butyrate, and the like.

Exemplary polyamides include aliphatic polyamides such as nylon-6, nylon-66, nylon-10, nylon-12, nylon-46, and the like; aromatic polyamides produced from an aromatic dicarboxylic acid, or an aliphatic diamine; and the like.

Exemplary polyacetals includes polyformaldehyde (e.g., polyoxymethylene), polyacetaldehyde, polypropionaldehyde, polybutylaldehyde, and the like.

The polystyrene can be a homopolymer of styrene or a copolymer comprising units derived from styrene and another monomer, for example acrylonitrile, methyl methacrylate, or α-methylstyrene.

The ABS can comprise a constituent unit derived from acrylonitrile in an amount of 10 to 50 mol %, specifically 20 to 35 mol %, more specifically 25 to 30 mol %, a constituent unit derived from butadiene in an amount of 10 to 50 mol %, specifically 20 to 30 mol %, more specifically 25 mol %, and a constituent unit derived from styrene in an amount of 10 to 90 mol %, specifically 40 to 60 mol %, more specifically 50 mol %.

Exemplary polycarbonates include a polymer obtained from bis(4-hydroxyphenyl)methane, 1,1-bis(4-hydroxyphenyl)ethane, 2,2-bis(4-hydroxyphenyl)propane, 2,2-bis(4-hydroxyphenyl)butane, and the like or a combination thereof.

An exemplary polyphenylene oxide includes poly(2,6-dimethyl-1,4-phenylene oxide).

Exemplary polyacrylates include poly(methyl methacrylate) and poly(butyl acrylate).

Although the combination of the first and second polymers is not particularly restricted, in one embodiment, the first and second polymers are of the same class, e.g., both are acrylates, both are both polyolefins, etc. While not wanting to be bound by theory, it is believed that using polymers of the same class enhances the compatibility of the polymers in the polymer composition. Thus, in this embodiment the monomer(s) used in the manufacture of the second polymer are the same or substantially the same as the second monomer used in the manufacture of the first polymer. For example, when the second polymer is derived from ethylene, such as an ethylene homopolymer, or a copolymer of ethylene and an α-olefin, the first polymer is obtained by copolymerizing a monomer of Formula A and ethylene. In an embodiment, the first polymer is a polymer derived from an olefin, in particular ethylene.

The first polymer and the second polymer are mixed so that the amount of a monomer unit derived from a monomer of Formula A in the polymer composition is equal to or less than 4 wt %, specifically equal to or less than 3 wt %, more specifically equal to or less than 2 wt %, based on the total weight of the polymer components in the polymer composition. In an embodiment, the first polymer and the second polymer are mixed so that the amount of a monomer unit derived from a compound of Formula A contained in the polymer composition is 0.01 wt % or more, specifically 0.05 wt % or more, based on the total weight of the polymer components in the polymer composition.

The polymer composition can also be used together with an additive, such as a flame retardant, an antioxidant, an antiblocking agent, a neutralizing agent, a lubricant, a deglosser, a mold release agent, a filler, an ultraviolet light absorbent, an infrared absorbant, and the like, or a combination thereof. The selection and amount of such additives will depend on the particular application, and can be readily determined by one of ordinary skill in the art without undue experimentation.

Any of the polymer compositions described herein (including those having the copolymer as the only polymer component, and those having the copolymer as a first polymer together with a second polymer) can form a crystal having a degree of orientation equal to or greater than 0.1, specifically 0.5, more specifically 1 when processed according to the following method. It is believed that when the degree of orientation is equal to or less than 0.01, a structure of a nucleus of crystallization almost disappears within 300 seconds such that crystallization during deformation is not substantially promoted.

First, the polymer composition is press-molded to obtain a sample, which is kept at a temperature 29° C. greater than the melting point of the polymer composition for 3 minutes. The sample is then cooled to a temperature 9° C. greater than the melting point of the polymer composition. The sample is then elongated at a Hencky rate of 1 inverse seconds ($s^{-1}$) for 1 second at a temperature that is less than 9° C. greater than the melting point of the polymer composition, and the sample is held at this temperature 9° C. greater than the melting point for 300 seconds while maintaining the elongated condition thereof. The sample is quenched at room temperature to form a crystal. The crystal degree of orientation is determined from the azimuthal angle distribution of the diffraction intensities corresponding to an a00 plane and a 0b0 plane, when measured by two-dimensional X-ray diffraction.

The melting point of any of the polymer compositions described herein can be determined by the following method. Using a differential scanning calorimeter, such as a DSC-7 differential scanning calorimeter manufactured by Perkin Elmer, an aluminum pan containing 10 mg of a sample is first held at a first temperature ("T1") for 5 minutes, wherein T1 is 20° C. greater than the melting completion temperature. Thus, for example, T1 can be between 100° C. and 180° C. for an ethylene based polymer. Second, the aluminum pan is cooled from T1 to a second temperature ("T2") at 5° C. per minute (° C./min), wherein T2 is at least 30-50° C. less than the crystallization peak temperature. For example, T2 can be −50° C. to 20° C. for an ethylene based polymer. Third, the aluminum pan is held at T2 for 2 minutes. Fourth, the aluminum pan is heated at 5° C./min from T2 to T1, and the maximum melting temperature in a differential scanning calorimetry curve obtained in the fourth measurement is determined to be the melting point.

Elongation of a sample at a Hencky strain rate of 1 $s^{-1}$ for 2 seconds can be performed using a commercially available melt elongation measurement apparatus, such as an ARES, which is manufactured by TA Instruments. If the sample is broken by elongation for 2 seconds, elongation for 1 second is applied.

A two-dimensional X-ray diffraction image can be obtained by measuring diffraction from a sample using an imaging plate, such as, for example an imaging plate manufactured by Fuji Photo Film Co., Ltd., using a commercially available laboratory X-ray generation apparatus, such as a MicroMax-007, which is manufactured by RIGAKU and generates monochromatic X-rays using a Cu target.

Calculation of the degree of orientation from the resulting two-dimensional X-ray diffraction image is carried out according to the following procedure. First, the two-dimensional X-ray diffraction image is circularly averaged to obtain a one-dimensional X-ray diffraction profile. Second, the azimuthal angle distribution of the X-ray diffraction intensities of an a00 reflection or a 0b0 reflection are measured in a range from a first scattering angle ("θ1"), which is smaller than a peak scattering angle, to second scattering angle ("θ2"), which is greater than the peak scattering angle, wherein the first and second scattering angles are angles at which the intensity of the a00 reflection or the 0b0 reflection are 60% less than the peak diffraction intensity in the one-dimensional X-ray diffraction profile, when the intensity is monotonically decreasing. However, if the scattering intensity increases due to an adjacent diffraction peak before reaching 60% of the diffraction intensity at the peak position, the angle at the lowest diffraction intensity is adopted as θ1 or θ2. The degree of orientation is calculated using the reflection showing the best separation from other reflections in the one-dimensional X-ray diffraction profile.

Third, the degree of orientation is calculated using Herman's orientation function ("f") as shown in the following Formula B, wherein it is understood that the angle of maximum (i.e., peak) scattering intensity of the resulting azimuthal angle distribution is an azimuthal angle of 0°. In determining the angle of the maximum scattering intensity, if the signal to noise ratio of the data is insufficient, the angle of maximum intensity can also be determined by fitting the data to a suitable function, such as the Gaussian function, a Lorentzian function, and the like.

Herman's orientation function f is represented by the following Formula B:

$$f = \frac{1}{2}(3\langle\cos^2\theta\rangle - 1), \text{ wherein}$$

$$\langle\cos^2\theta\rangle = \frac{\int_0^{\pi/2} F(\theta)\sin\theta\cos^2\theta d\theta}{\int_0^{\pi/2} F(\theta)\sin\theta d\theta},$$

Formula B

θ represents an angle made by the X-ray diffraction plane against the orientation axis, and F represents the diffraction intensity.

Any of the polymer compositions disclosed herein can be utilized as a film or a sheet in a wide variety of applications, for example in thermal management, optical films, and the like. Such films or sheets are of particular utility in thermal management, because the sheets can have anisotropic thermal conductivity. Similarly, when used as optical films, the films can be manufactured to have a selected degree of birefringence.

The invention and particular embodiments will be further explained by the examples and comparative examples below.

EXAMPLES

Evaluations in the examples and comparative examples were carried out according to the following methods.

Molecular Weight Distribution ("$M_w/M_n$") was obtained using a gel permeation chromatograph ("GPC") method to measure the weight average molecular weight ("$M_w$") and the number average molecular weight ("$M_n$"). The GPC method was conducted using a Polymer Laboratories PL-220 high temperature GPC, wherein the separation column was a standard triple bank, the measurement temperature was 135° C., the carrier was trichlorobenzene, the flow rate was 1.0 ml/min, the detector used differential refractometry using a dn/dc value of −0.11 for polyethylene, and the molecular weight standard was a narrow molecular weight polystyrene standard, which was used for a universal calibration using appropriate Mark-Houwink constants for polyethylene. The base line on the chromatogram was a straight line obtained by connecting a point in a first stable horizontal region, in which the retention time is sufficiently shorter than emergence of the sample elution peak, and a point in a second stable horizontal region in which the retention time is sufficiently longer than observation of the solvent elution peak. The molecular weight is a value deduced by comparison to polyethylene by correction.

Quantitative determination of POSS content in the polymer composition was performed using $^1H$ and $^{13}C$ NMR spectroscopy. The instrument was a Bruker AMX-500 FT NMR, the measurement solvent was tetrachloroethane-$d_2$, and the measurement temperature was 100° C. Quantitative $^{13}C$ NMR spectra were acquired using a standard inverse-gated proton decoupling sequence with a relaxation delay of 6 seconds. Sufficient transients were acquired to obtain a signal-to-noise ratio of at least 20.

Maximum melting point ("$T_m$") was determined by pressing a polymer or polymer composition for 5 minutes under a pressure of 10 megaPascals (MPa) at 150° C. using a thermal press machine, then cooling for 5 minutes using a cooling press machine at 30° C., then molding into a sheet having a thickness of 100 micrometers (μm). A sample of 10 mg was cut out from the sheet, and enclosed in an aluminum pan. Next, the aluminum pan containing the enclosed sample was (1) held at 150° C. for 5 minutes, (2) cooled from 150° C. to 20° C. at 5° C./min, (3) held at 20° C. for 2 minutes, (4) heated at 5° C./min from 20° C. to 150° C., and a melting curve in step (4) was measured using a DSC-7 differential scanning calorimeter (Perkin Elmer). Tm was determined from the resultant melting curve, and was the temperature at the top of the highest melting peak from those peaks obtained from 25° C. to the melting completion temperature (the temperature at which the melting curve returns to a base line at a higher temperature).

Measurement of the degree of orientation of an elongated sample was determined from a sample prepared and treated as follows. Rectangular-shaped samples for elongation having the dimensions 10 millimeters (mm) (width)×20 mm (length)×0.7 mm (thickness) were prepared by cutting them out from press-sheet samples obtained by pre-heating a sample at 150° C. for 5 minutes, thermally pressing for 5 minutes at 4 to 6 MPa, and then cooling to 25° C. while pressed. Elongation of a sample at a Hencky strain rate of 1 $s^{-1}$ for 2 seconds was carried out using an ARES instrument (TA Instruments). If the sample was broken by elongation for 2 seconds, elongation for 1 second was performed. A rectangular-shaped sample was initially kept at a temperature of 150° C. for 3 minutes, then cooled to 130° C. and held at 130° C. for 5 minutes, then, elongated at a Hencky strain rate of 1 $s^{-1}$ for 2 seconds, then held in an elongated condition for 300 seconds at 130° C. After 300 seconds, the sample room was opened, and a cooling spray was sprayed on the sample to cause crystallization thereof in one shot. The variation of stress was recorded during the elongation and relaxation procedures.

A two-dimensional X-ray diffraction image of the crystallized, elongated sample was measured using Cu $K\alpha_1$ radiation on a MicroMax-007 instrument (RIGAKU), with a camera distance was 100 mm, and using an imaging plate manufactured by Fuji Photo Film Co., Ltd. as a detector. Calculation of the degree of orientation from the resulting two-dimensional X-ray diffraction image was carried out according to the following procedure. First, the resulting two-dimensional X-ray diffraction image was circularly averaged to obtain a one-dimensional X-ray diffraction profile. Second, the azimuthal angle distribution of the X-ray diffraction intensity of the 200 reflection was measured in a range from a first scattering angle $\theta 1$ at the smaller angle side nearest to the peak scattering angle, to a second scattering angle $\theta 2$ at the wider angle side, in which the intensity of the 200 reflection of orthorhombic crystal of sample was 60% of the diffraction intensity at the peak position in the one-dimensional X-ray diffraction profile. Third, the degree of orientation was calculated using Herman's orientation function f represented by the Formula B, above, wherein it is understood that the angle of peak scattering intensity of the resulting azimuthal angle distribution is an azimuthal angle of 0°.

Measurement of the degree of orientation of a sheared sample was determined from a sample prepared and treated as follows. A crystalline polymer was pre-heated at 150° C. for 5 minutes, pressed for 5 minutes, and then cooled for 5 minutes in a press at 30° C. to obtain a molded sheet. The molded sheet was punched with a dumbbell into a circular disk having a diameter of 25 millimeters (mm) and a thickness of 0.3 mm to obtain a sample for evaluation. A CSS 450 apparatus (Linkam Scientific Instruments, Ltd.) was used as a shearing apparatus. The circular disk sample was heated to 150° C., then the gap was tightened to 250 micrometers (μm) and held for 5 minutes. Thereafter, the sample was cooled at 30° C./min to shear temperature ("Ts") and held for 1 minute. When the shear temperature was 150° C., the 1 minute annealing procedure was omitted. Next, shear was applied at a selected shear rate for a selected time period. After application of the shear, the sample was held at 130° C. for 300 seconds, then cooled at 30° C./min to 50° C. After the sample was cooled, the sample was taken out of the shearing apparatus and used for the evaluation of the degree of orientation. Collection and evaluation of the two-dimensional X-ray diffraction image to determine the degree of orientation was the same as that used for the elongated samples except that the position where X-rays were irradiated was the window position of the shearing apparatus.

Crystallization initiation temperature was measured after application of shearing as follows. A crystalline polymer was pre-heated at 150° C. for 5 minutes, pressed for 5 minutes, and then cooled for 5 minutes in a press at 30° C. to obtain a molded sheet. The molded sheet was punched with a dumbbell into a circular disk having a diameter of 25 mm and a thickness of 0.3 mm to obtain a sample for evaluation. A CSS 450 apparatus (Linkam) was used as a shearing apparatus. The circular disk sample was heated to 150° C., then the gap was tightened to 250 μm and held for 5 minutes. Thereafter, the sample was cooled at 30° C./min to shear temperature (Ts:130° C., 140° C. and 150° C.) and held for 1 minute (In the case of Ts=150° C., 1 minute annealing at Ts was omitted). Next, shear was applied at 35 $s^{-1}$ for 2 seconds. After application of the shear, the sample was held at each temperature for 300 seconds, then cooled at 30° C./min to 50° C.

Crystallization occurring during cooling from 130° C. to 50° C. was measured by small angle X-ray scattering ("SAXS"). SAXS measurement was carried out on a small angle X-ray scattering beam line (BL-15A) in the synchrotron radiation facility Photon Factory at the High Energy Accelerator Research Organization. A charge-coupled device ("CCD") type X-ray detector coupled with an image intensifier was used as the detector. The camera length was 2 m, and the X-ray wavelength was 1.50 angstroms (Å). SAXS measurement was carried out at every 0.5° C. from 130° C., and the crystallization initiation temperature was estimated from the starting point of an increase in the integral scattering intensity of the recorded scattering during cooling.

Example 1

A crystal nucleating agent was obtained by polymerization as follows. A 1 milligram (mg) quantity of a solution prepared by dissolving ethylenebisindenylzirconium dichloride in toluene was brought into contact with 0.25 milliliters (mL) of a 30 mol % methylaluminoxane ("MAO") solution for 15 minutes to provide a catalyst component. In a 100 mL flask, the POSS of Formula A5 wherein R is ethyl (hereinafter referred to as ethylPOSS), was dissolved in 18 mL of toluene, and ethylene was continuously supplied by bubbling ethylene gas (15 pounds per square inch (psi)) through the toluene solution. After bubbling for 1 minute, the catalyst component was added to the flask to initiate polymerization. After polymerization for 1 hour, a 10% vol. % hydrochloric acid solution in methanol solution was added to stop the reaction. The copolymer product was precipitated by further addition of an excess of methanol, then isolated by filtration to yield an ethylene-ethylPOSS copolymer having an $M_n$ of 180,000, a molecular weight distribution ($M_w/M_n$) of 2.89 and an ethylPOSS content of 2.1 mol %, in a yield of 42 wt %.

This copolymer was used as a crystal nucleating agent ("A-1") in a polymer composition as follows. The crystal nucleating agent A-1 and a commercially available ethylene-1-butene copolymer ("B") (Sumikathene L FS240, from Sumitomo Chemical Co., Ltd.), were weighed to provide a composition having a weight ratio of (A-1):(B)=3:97. The weighed quantities of A and B were added to a 500 mL eggplant-shaped flask to obtain a concentration of 1 wt % in 100 ml of m-xylene, which contained 0.1 wt % of BHT, and dissolved at 130° C. During dissolution, stirring was continued for uniformity. The reaction mixture was held at 130° C. while stirring for 10 minutes to cause sufficient dissolution, then, the m-xylene solution was poured into 500 mL of methanol, to cause deposition of a polymer. The polymer was recovered by filtration under reduced pressure, and dried for half day in a vacuum drier. Thereafter, a methanol solution of BHT (1 wt %) was sprayed on the polymer by an atomizer several times on the polymer to add an antioxidant. Methanol was vaporized by storing in a draft, then the polymer was pre-heated at 150° C. for 5 minutes, pressed while heating for 5 minutes, then cooled in a press at 30° C. for 5 minutes to obtain a sample in the form of sheet. The resulting sample was evaluated for various physical properties and characteristics and the results are shown in Table 1.

Example 2

A sample in the form of sheet was obtained in the same manner as in Example 1 except that the crystal nucleating agent (A-1) and the ethylene-1-butene copolymer (B) were used at a weight ratio of 1:99. The resulting sample, in the form of sheet, was evaluated for various physical properties and characteristics and the results are shown in Table 1.

Example 3

A sample in the form of sheet was obtained in the same manner as in Example 1 except that the crystal nucleating agent and the ethylene-1-butene copolymer were used at a ratio of 0.1:99.9. The resulting sample, in the form of sheet, was evaluated for various physical properties and characteristics and the results are shown in Table 1.

Comparative Example 1

Pellets of a commercially available high pressure low density polyethylene ("A-2") (Sumikathene F101, from Sumitomo Chemical Co., Ltd.) and pellets of an ethylene-1-butene copolymer (B) were blended at a weight ratio of (A-2):(B)= 10:90, then granulated and kneaded at 210° C. using a dulmadge type screw in a 30-mm diameter single-screw granulator to obtain pellets of the blended sample. The resultant melted blend pellets were pre-heated at 150° C. for 5 minutes, hot pressed for 5 minutes, then cooled for 5 minutes in a press at 30° C. to obtain a sample in the form of sheet. The resultant sheet sample was evaluated for various physical properties and characteristics and the results are shown in Table 1.

Comparative Example 2

Pellets of an ethylene-1-butene copolymer (B) were pre-heated at 150° C. for 5 minutes, pressed with heating for 5 minutes, then cooled for 5 minutes in a press at 30° C. to obtain a sample in the form of sheet. The resultant sheet sample was evaluated for various physical properties and characteristics and the results are shown in Table 1.

Comparative Example 3

Pellets of a commercially available ultra-high molecular weight polyethylene ("A-3") (Hizex Million 140M, from Mitsui Chemicals Inc.) and pellets of an ethylene-1-butene copolymer (B) were selected so that the weight ratio of (A-3): (B)=1:99. The materials were mixed to obtain a concentration of 1 wt % in 100 ml of m-xylene, which contained 0.1 wt % of BHT, and dissolved at 130° C. During dissolution, stirring was continued for uniformity. The reaction mixture was held at 130° C. while stirring for 10 minutes to cause sufficient dissolution, then the solution was poured into 500 ml of methanol to cause deposition of a crystalline polymer. The deposited polymer was recovered by filtration under reduced pressure, and dried for half day in a vacuum drier. Thereafter, a methanol solution of BHT (1 wt %) was sprayed on the polymer by an atomizer several times to add an antioxidant. Methanol was vaporized sufficiently in a draft, then the polymer was pre-heated at 150° C. for 5 minutes, pressed while heating for 5 minutes, then cooled in a press at 30° C. for 5 minutes to obtain a sample in the form of sheet. The resulting sheet sample was evaluated for various physical properties and characteristics and the results are shown in Table 1.

TABLE 1

| Property | Ex. 1 | Ex. 2 | Ex. 3 | C. Ex. 1 | C. Ex. 2 | C. Ex. 3 |
| --- | --- | --- | --- | --- | --- | --- |
| Tm | 121° C. | 121° C. | 121° C. | 121° C. | 121° C. | 121° C. |
| Degree of crystal orientation | 0.05 | 0.02 | 0 | 0 | 0 | 0 |
| Elongation time | 1 sec * | 2 sec | 2 sec | 2 sec | 2 sec | 2 sec |

TABLE 1-continued

| Property | Ex. 1 | Ex. 2 | Ex. 3 | C. Ex. 1 | C. Ex. 2 | C. Ex. 3 |
|---|---|---|---|---|---|---|
| Crystallization initiation temperature after shear at 130° C. | 125° C. | 123° C. | 121.5° C. | ** | 118° C. | ** |
| Crystallization initiation temperature after shear at 140° C. | 124.5° C. | 121.5° C. | ** | ** | ** | ** |
| Crystallization initiation temperature after shear at 150° C. | 121° C. | 118.5° C. | ** | ** | ** | ** |

\* Broken by elongation for 2 seconds
\*\* No measurement

The results in Table 1 show that a degree of crystal orientation is observed in Examples 1 and 2, but not in Comparative Examples 1 to 3. Also, the crystallization initiation temperature of Examples 1 and 2 is also higher than that of Comparative Example 2.

Elongation properties, which were evaluated by rheometry analysis of the material of Example 2 and Comparative Example 1 at 140° C., are shown in FIG. 1. The results shown in FIG. 1 illustrate that a strain-hardening property is hardly observed in Example 2.

The degree of orientation for the materials of Examples 1 and 2 were determined using WAXS data according the method described above based on Herman's orientation function. The results are shown in Table 2.

TABLE 2

| Example | Ts = 130° C. | Ts = 140° C. | Ts = 150° C. |
|---|---|---|---|
| Example 1 | 0.03 | 0.04 | 0.03 |
| Example 2 | 0.02 | 0.02 | 0.01 |
| Comp. Ex. 1 | nd | nd | nd |

Ts: Temperature at which shear was applied.
nd: not determined (two peaks in the azimuthal distribution were not determined).

Figure 2:
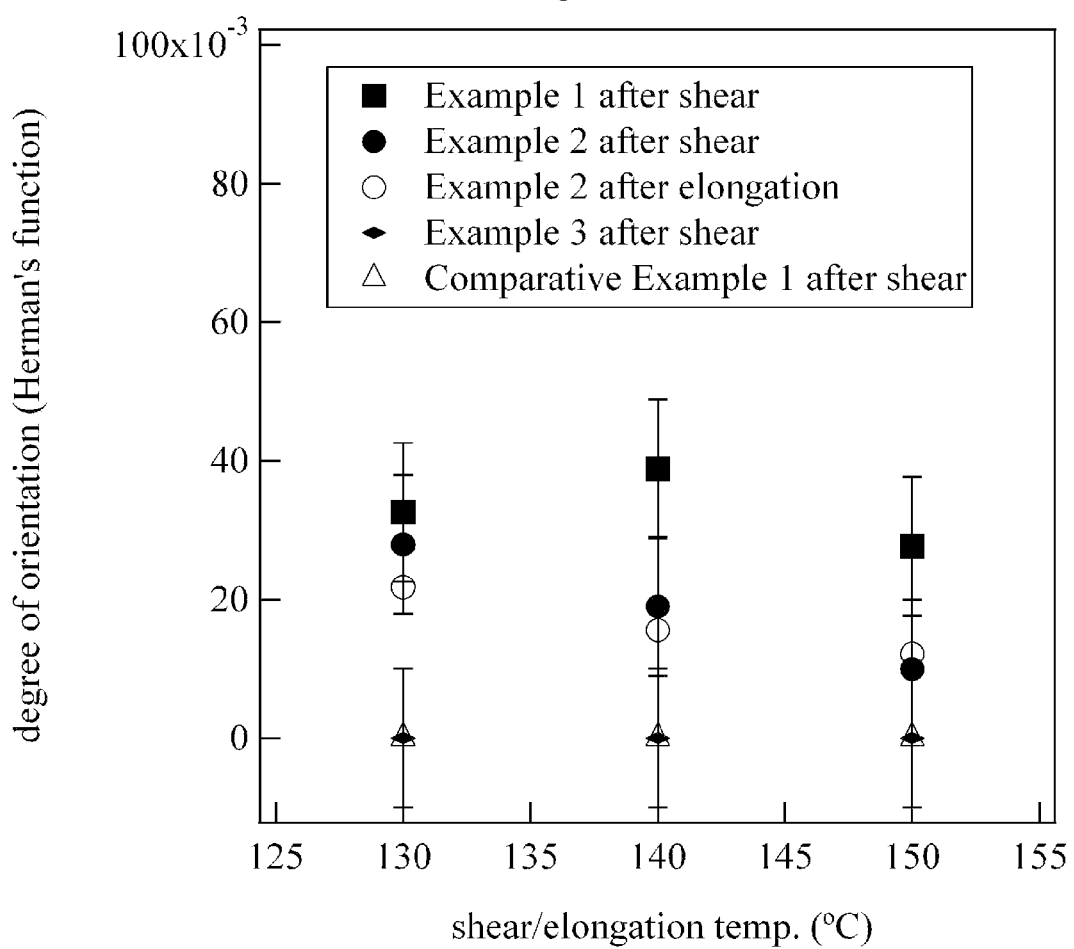
FIG. 2 is a graph illustrating degree of orientation (Herman's function) versus shear or elongation temperature (degrees Celsius) of the polymer compositions synthesized as described in Examples 1 to 3 and Comparative Example 1.

Shear and elongation results for the foregoing Examples and Comparative Examples are summarized in FIG. 2. As shown in FIG. 2, the difference between the degree of orientation upon shear and elongation is small. In addition, the results in FIG. 2 demonstrate that addition of a POSS provides a high degree of control of crystal orientation.

The dependence of crystal orientation on shear rate was determined using WAXS data according the method described above based on Herman's orientation function as described above. The total shear was fixed at 7000%. The results are shown in Table 3.

TABLE 3

| Example | Orientation at 0.2 s$^{-1}$ | Orientation at 1 s$^{-1}$ | Orientation at 3.5 s$^{-1}$ | Orientation at 7 s$^{-1}$ | Orientation at 35 s$^{-1}$ |
|---|---|---|---|---|---|
| Example 2 | 0.01 | 0.02 | 0.02 | 0.02 | 0.03 |

Figure 3:
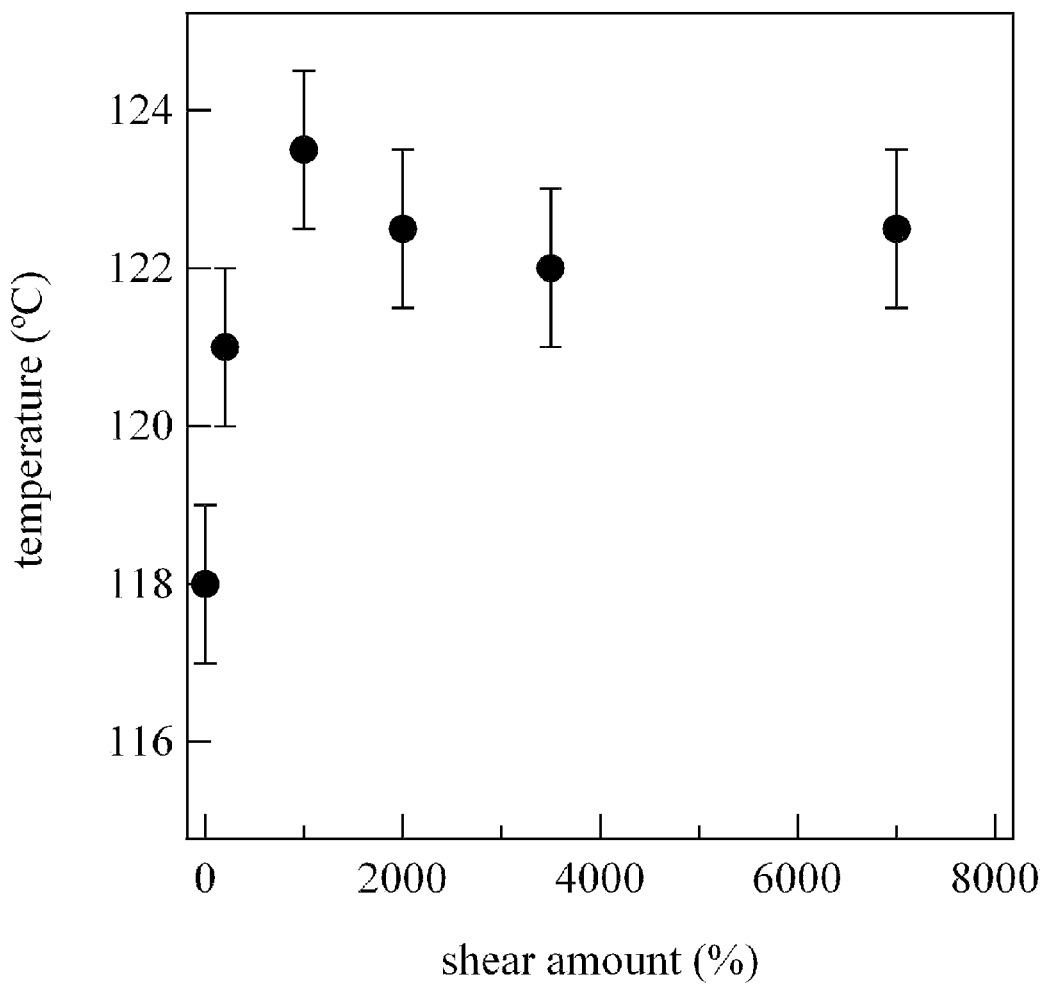
FIG. 3 is a graph illustrating crystallization temperature (degrees Celsius) versus shear (percent) of the polymer composition synthesized as described in Example 2.

The results in Table 3 show that the shear rate dependence of the degree of crystal orientation for the material of Example 2 is very small. In contrast, the material of Comparative Examples 1 to 3 did not retain a crystal orientation. Also, shown in FIG. 3 is the crystallization temperature at various amounts of shear for the polymer composition synthesized as described in Example 2 at a shear rate of 1 s$^{-1}$.

The terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that although the terms first, second, third, etc. are used herein to describe various elements, components, regions, layers, and the like, these terms are only used to distinguish one element, component, region, or layer from another. Unless otherwise defined, all terms (including technical and scientific terms) used herein have the same meaning as commonly understood by one of ordinary skill in the art to which this invention belongs.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polymer composition, comprising:
    a first polymer, comprising
        a first monomer unit derived from a monomer of Formula A:

$$(R^1SiO_{1.5})_x(R^2SiO_{1.5})_y \qquad \text{Formula A}$$

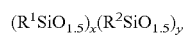

wherein
       $R^1$ is a polymerizable functional group,
       $R^2$ is a non-polymerizable group, and
       x is a positive integer and y is a positive integer, provided that x+y=2n, wherein n is an integer greater than or equal to 3;
    a second monomer unit copolymerizable with the first monomer unit; and
   a second polymer having no monomer units derived from a monomer of Formula A;
   wherein the content of the monomer unit of Formula A is 4 wt % or less, based on the total weight of the polymer components of the polymer composition, and
   wherein the content of the first polymer is from 0.1 to 3% by weight and the content of the second polymer is from 99.9 to 97% by weight.

2. The polymer composition according to claim 1, wherein the first polymer comprises the first monomer unit in an amount of 0.1 to 5 mole percent, based on the total moles of monomer in the first polymer.

3. The polymer composition according to claim 1, wherein $R^1$ is an ethylenically unsaturated group.

4. The polymer composition according to claim 1, wherein $R^2$ is an alkyl group having from 1 to 10 carbon atoms.

5. The polymer composition according to claim 1, wherein $R^2$ is an ethyl group.

6. The polymer composition according to claim 1, wherein the monomer according to Formula A has the structure:

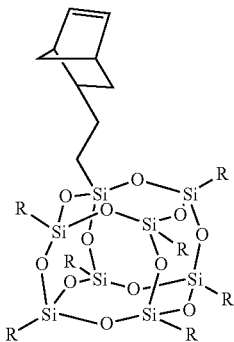

wherein each R is independently selected from the group consisting of $R^1$ and $R^2$.

7. The polymer composition according to claim 1, wherein the second monomer unit is derived from an olefin.

8. The polymer composition according to claim 7, wherein the olefin is an alpha-olefin.

9. The polymer composition according to claim 7, wherein the olefin is ethylene.

10. The polymer composition according to claim 1, wherein the second polymer is a polyolefin.

11. The polymer composition according to claim 1, wherein the second polymer comprises a first monomer unit derived from ethylene.

12. The polymer composition according to claim 1, wherein the second polymer is poly(ethylene-butylene).

13. A method for the manufacture of the polymer composition of claim 1, comprising melt blending the first polymer and the second polymer.

14. An article comprising the composition of claim 1.

15. A method for the manufacture of the article of claim 14, comprising
melt blending the first polymer and the second polymer;
molding the melt-blended composition; and
cooling the melt-blended compositions at a rate effective to crystallize the polymer composition.

16. A polymer composition having a degree of orientation equal to or greater than 0.01 when measured by a method comprising:
heating a press-molded test piece having a width of 10 millimeters, a length of 20 mm, and a thickness of 0.7 mm at a temperature 29° C. greater than the melting point of the polymer composition for 3 minutes;
cooling the press-molded test piece to a temperature 9° C. greater than the melting point of the polymer;
elongating at a Hencky rate of 1 s$^{-1}$ for 2 seconds, unless the press-molded test piece is broken, in which case the press-molded test piece is elongated for 1 second;
maintaining the elongated condition for 300 seconds;
quenching the press-molded test piece; and
determining a degree of orientation from an azimuthal angle distribution of diffraction intensities corresponding to an a00 plane and a 0b0 plane, when measured by two-dimensional X-ray diffraction, wherein the polymer composition comprises a first polymer comprising a first monomer unit derived from a monomer of Formula A:

$$(R^1SiO_{1.5})_x(R^2SiO_{1.5})_y \quad \text{Formula A}$$

wherein
$R^1$ is a polymerizable functional group,
$R^2$ is a non-polymerizable group, and
x is a positive integer and y is a positive integer, provided that x+y=2n, wherein
n is an integer greater than or equal to 3; and
a second monomer unit copolymerizable with the first monomer unit; wherein the content of the monomer unit of Formula A is 4 wt % of less, based on the total weight of the polymer components of the polymer composition.

17. The polymer composition according to claim 1, wherein the second polymer is a polyethylene homopolymer.

* * * * *